G. W. UPTON.
FISHING ROD HANDLE.
APPLICATION FILED OCT. 18, 1910.

1,001,326.

Patented Aug. 22, 1911.

Witnesses
William J. Boay
Audrey Doty

Inventor
George W. Upton.

UNITED STATES PATENT OFFICE.

GEORGE W. UPTON, OF WARREN, OHIO.

FISHING-ROD HANDLE.

1,001,326.  Specification of Letters Patent.  Patented Aug. 22, 1911.

Application filed October 18, 1910. Serial No. 587,759.

*To all whom it may concern:*

Be it known that I, GEORGE W. UPTON, a citizen of the United States, residing at Warren, in the county of Trumbull and State of Ohio, have invented certain new and useful Improvements in Fishing-Rod Handles, of which the following is a specification.

My invention relates to improvements in fishing rod handles; and the object of my improvement is to provide a handle that shall be resilient when a heavy bait is cast and which can be instantly shortened to a convenient length after the bait strikes the water and when the line is to be rewound on the reel. I attain this object by the mechanism illustrated in the accompanying drawing, in which—

Figure 1:
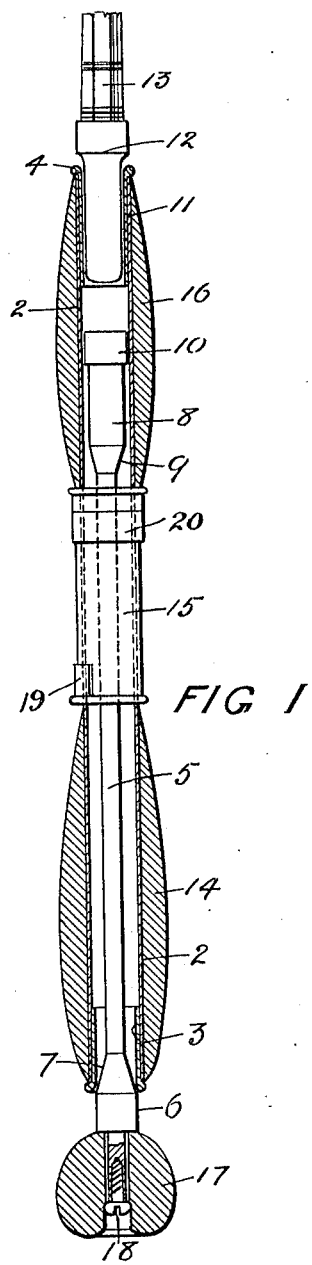
Figure 2:
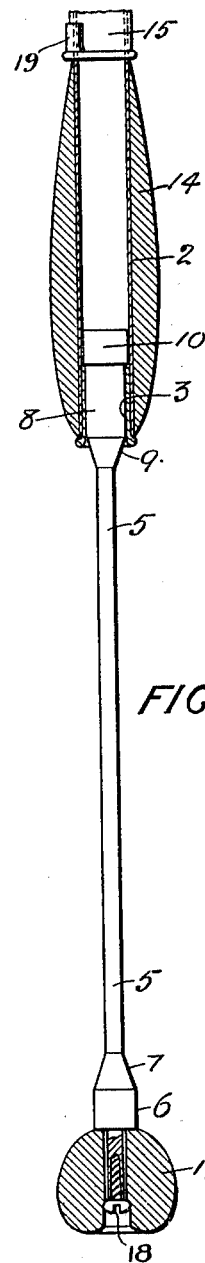

Figure 1 is a vertical section of the entire rod handle, with the reel seat and a part of the butt joint of a rod in elevation. Fig. 2 is a vertical section of the rod handle, below the reel seat, with the extensible part fully drawn out.

A tube 2 extends entirely through the length of the handle. An outer ferrule 3, open at both ends, is inserted in one end of the tube 2. A rod 5, made of resilient and springy material, either of wood or metal, is provided with a head 6 of the size of the inside of the ferrule 3, and if the rod 5 is much smaller than the inside of tube 2 it is preferable to bevel the inner end of the head 6 as shown by taper 7. At the other end of the rod 5 an enlargement 8 is made whose outer circumference snugly fits the inside of ferrule 3 and a tapered shoulder 9 is found to be convenient and useful. A second enlargement 10 is made on rod 5, of a size to fit easily the interior surface of the tube 2.

When the head 6 and the enlargements 8 and 10 have been attached to rod 5 it is inserted in the tube 2 through the end 4 and another outer ferrule 11, of any size to fit the inner or center ferrule 12 of the rod butt joint 13, is fastened into the end 4 of the tube 2.

A suitable hand grasp 14, of cork or any desired material, is slipped over the tube to the bottom thereof; a reel seat 15, bearing one or more hoods 19 and a reel band 20 or other cross plate locking device, is slipped over the tube 2 down to the grasp 14, and when a grasp is desired above the reel seat a similar grasp 16 is pushed on the tube 2 till it meets the reel seat 15.

The head 6 and the enlargement 10 are so placed on the rod 5 that the total length of the rod 5, the head 6 and the enlargements 8 and 10, is equal to the length of the tube 2 from its lower end to the bottom of ferrule 11. The rod 5 is extended far enough to enable one to fasten on it by means of a screw 18 or by any other means, an auxiliary grasp 17, conveniently made to fit the palm of one's hand, and of any desired shape and material.

In operation the line is wound on the reel until the heavy bait is near the tip of the rod; the fisherman grasps the rod handle with one hand, either at the grasp 14 or at the grasp 16, and taking the auxiliary grasp 17 in the other hand draws the rod 5 out of the handle until the enlargement 8 is firmly seated in the ferrule 3 beyond which it cannot pass because of the enlargement 10, as shown in Fig. 2. A slight forward movement of the hand holding grasp 14 or grasp 16, accompanied by a slight, springy backward movement of the hand holding the grasp 17 causes the spring of the rod 13 to cast the bait much farther and with less effort than can a cast be made with a nonyielding handle. After the cast is made the fisherman at once forces the grasp 17 upward until the head 6 seats itself in the ferrule 3 and then, in ordinary practice, places the grasp 17 against his body, seizes either grasp 14 or grasp 16 with one hand and the handle of his reel with the other.

It will be apparent that by the use of this mechanism the inconvenience of the longer handle is done away with and superior facilities are given the angler for landing his fish with certainty and comfort.

I have shown but a preferred form of handle for rods of superior quality. My invention, however, can be equally well applied to less expensive handles by turning said handles from wood and merely boring a hole throughout the length thereof, instead of using the tube 2. Ferrules 3 and 11 can also be omitted, and the omission of ferrule 3 would obviate the need of enlargement 8.

My invention can also be as well applied to handles with but a single hand grasp, either above or below the reel seat, and also to handles which are rigidly attached to and made part of the rod. Therefore, broadly;
I claim:

1. A hollow handle for fishing rods having an extensible, resilient member telescoping therein provided with a second handle.

2. An extension for fishing rod handles made of springy material and adapted to slide into said handle when not in use provided with a second handle.

3. The combination of a handle for fishing rods having a central bore, an extensible member for said handle adapted to enter said bore and to be withdrawn therefrom and provided with a second handle, and means for retaining said member in position when inserted into or drawn out from said bore, substantially as described.

4. In a fishing rod handle the combination of a hollow hand grasp bearing a reel seat and a resilient, extensible member partly within said hand grasp and adapted to be partly withdrawn from said hand grasp and provided with a second handle and locked for temporary use while extended, substantially as described.

5. In a fishing rod handle, the combination of an independent member made of resilient material, a grasp at one end of said member and a cavity in the handle itself adapted to receive said independent member when not in use, as described.

In testimony whereof I affix my signature in presence of two witnesses.

GEORGE W. UPTON.

Witnesses:
 E. A. GRIMM,
 AUDREY DOTY.

Copies of this patent may be obtained for five cents each, by addressing the "Commissioner of Patents, Washington, D. C."